United States Patent
Chang et al.

(10) Patent No.: US 12,339,554 B2
(45) Date of Patent: Jun. 24, 2025

(54) SELF-POWERED CHOLESTERIC LIQUID CRYSTAL DISPLAY DEVICE AND MAXIMUM POWER TRACKING METHOD

(71) Applicant: IRIS OPTRONICS CO., LTD., Tainan (TW)

(72) Inventors: Chung-Yi Chang, Tainan (TW); Wu-Chang Yang, Tainan (TW); Chi-Chang Liao, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 18/399,683

(22) Filed: Dec. 28, 2023

(65) Prior Publication Data
US 2024/0241416 A1    Jul. 18, 2024

(30) Foreign Application Priority Data
Jan. 16, 2023 (TW) .................................. 112101886

(51) Int. Cl.
| | |
|---|---|
| *G02F 1/137* | (2006.01) |
| *G02F 1/133* | (2006.01) |
| *G02F 1/1333* | (2006.01) |
| *H02J 7/35* | (2006.01) |

(52) U.S. Cl.
CPC ...... *G02F 1/13718* (2013.01); *G02F 1/13324* (2021.01); *G02F 1/133382* (2013.01); *H02J 7/35* (2013.01); *H02J 2300/26* (2020.01)

(58) Field of Classification Search
None
See application file for complete search history.

(56) References Cited

U.S. PATENT DOCUMENTS

| | | | |
|---|---|---|---|
| 8,018,426 B2 | 9/2011 | Ishibashi et al. | |
| 2008/0122780 A1* | 5/2008 | Ishibashi | G02F 1/13718 345/102 |
| 2011/0293970 A1* | 12/2011 | Shimura | H01M 10/465 429/7 |
| 2012/0062202 A1* | 3/2012 | Min | G05F 1/67 323/299 |

FOREIGN PATENT DOCUMENTS

| | | | |
|---|---|---|---|
| CN | 212587198 U | * | 2/2021 |
| JP | 2001-338273 A | | 12/2001 |

* cited by examiner

*Primary Examiner* — Shan Liu
(74) *Attorney, Agent, or Firm* — Cheng-Ju Chiang

(57) ABSTRACT

A self-powered cholesteric liquid crystal display (ChLCD) device and a method for tracking maximum power are disclosed. The ChLCD device includes a solar cell module, electrical energy for charging, an energy storage device, a charging unit, and a ChLCD module. The method of tracking the maximum power is: supply electrical energy for charging to the charging unit, sense the ambient temperature, and capture the sensed ambient temperature, correspond its value to the voltage value in the comparison data, and adjust the reference driving voltage with a resistor divider, and then electrically charging to the charging unit by the reference driving voltage, so that the charging unit can capture the maximum power of the electrical energy from the solar cell module, and then store the electrical energy in the energy storage device, to refresh the display screen of the ChLCD module and the ChLCD device can effectively utilize electricity.

8 Claims, 5 Drawing Sheets

SELF-POWERED CHOLESTERIC LIQUID CRYSTAL DISPLAY DEVICE AND MAXIMUM POWER TRACKING METHOD

BACKGROUND OF THE INVENTION

1. Field of the Invention

The present invention relates to a cholesteric liquid crystal display device designed to harness maximum power generation capacity, particularly a self-powered cholesteric liquid crystal display device and a method for tracking maximum power.

2. Description of Related Art

The cholesteric liquid crystal display device is bistable and exhibits partial reflection and penetration characteristics. It consumes energy during the screen refresh process but minimal power once completed. It is known from U.S. Pat. No. 8,018,426B2 and Japanese Publication No. JP2001-338273A that cholesteric liquid crystal display devices can be used with solar panels. When a light source illuminates the display device, it uses the reflective part of the light to display images and harnesses the penetrating part of the light to convert it into electric energy via the solar panel. This electric energy is stored in an energy storage device for subsequent screen refresh cycles. However, the display device can only receive electric energy from the solar panel, and this energy cannot be controlled at an optimal power level, limiting the ability to provide maximum power for the display device.

Distinguished Professor Rong-Jong Wai of the Department of Electronic Engineering at the National Taiwan University of Science and Technology noted in his solar cell research that "as the temperature increases by 1° C., solar panel voltage decreases, resulting in a 0.35% reduction in output power. Conversely, lower temperatures lead to greater output power". Professor Chao-Yu Chen from the Department of Photonics at National Cheng Kung University also mentioned: "The conversion efficiency of silicon solar cells does decrease as the temperature rises." It can be inferred that the maximum power point of the solar panel is related to the ambient temperature.

Therefore, to automatically track the maximum power in response to changing ambient temperatures and optimize the cholesteric liquid crystal display device for efficient charging and ideal energy-saving states, it is imperative to develop effective technical methods to address the aforementioned issues.

SUMMARY OF THE INVENTION

The objective of the present invention is to introduce a self-powered cholesterol liquid crystal display device and a method for tracking maximum power to enable the device to maximize power generation in various environments and achieve self-sufficiency in power.

The present invention relates to a self-powered cholesteric liquid crystal display device, comprising a solar cell module, an energy storage device, a cholesteric liquid crystal display module, a charging unit, and a power control system. The power control system also comprises a temperature sensor and a display control module.

The solar cell module generates electric energy for charging, and the energy storage device stores the electric energy. The cholesteric liquid crystal display module utilizes the stored electric energy to refresh the display screen. The charging unit that is electrically coupled to the solar cell module captures a reference driving voltage with a specific adjustment threshold. The electric energy is stored in the energy storage device in the maximum power captured from the solar cell module, and the electric energy for charging is used to generate the reference drive voltage through a resistor divider, which can be a digital resistor.

The temperature sensor of the power control system is used to sense the ambient temperature and can generate an $I^2C$ signal to the display control module. The display control module is electrically coupled to the temperature sensor and has a parameter memory unit. The parameter memory unit has the temperature value and the voltage value of the comparison data, and when the ambient temperature is the temperature value, the voltage value in the parameter memory unit is a voltage value of the electric energy for charging with maximum power from the solar cell module. Besides, the display control module adjusts and captures the electric energy for charging from the solar cell module through the resistor divider. This adjustment is based on the ambient temperature sensed from the temperature sensor and the voltage value from the comparison data of the parameter memory unit, aiming to derive a reference drive voltage with the specific regulation threshold.

The cholesteric liquid crystal display module of the cholesteric liquid crystal display device may also consist of a blue, a green, and a red cholesteric liquid crystal display modules stacked in that order, from top to bottom. From the user's viewing perspective, the solar cell module is positioned beneath the cholesteric liquid crystal display module.

In the cholesteric liquid crystal display device, the temperature value and the voltage value of the comparison data in the parameter memory unit can be derived from measuring the current and voltage of the solar cell module at different ambient temperatures in advance.

The temperature sensor of the cholesteric liquid crystal display device senses the ambient temperature and generates an $I^2C$ signal. The charging unit has a VIN pin and a VIN_REG pin. The VIN pin is electrically coupled to the VIN_REG pin through a resistor divider. When the ambient temperature changes, the charging unit will adjust the resistor divider according to the $I^2C$ signal, ensuring that the VIN_REG pin receives a reference driving voltage with a specific adjustment threshold.

The present invention also provides a method for tracking maximum power of a self-powered cholesteric liquid crystal display device. The cholesteric liquid crystal display device includes a solar cell module, an energy storage device, a charging unit, and a cholesteric liquid crystal display module. The solar cell module generates electric energy for charging, and the cholesteric liquid crystal display device includes temperature and voltage values of a comparison data. When the ambient temperature is the temperature value, the voltage value in the parameter memory unit is the voltage value of the electric energy for charging with maximum power from the solar cell module. The method for tracking maximum power comprises the following steps:

The solar cell module supplies the electric energy for charging to the charging unit while simultaneously sensing the ambient temperature. The sensed temperature value corresponds to a voltage value of the comparison data, which is used to adjust and capture the electric energy for charging from the solar cell module, creating a reference driving voltage with a specific adjustment threshold through a voltage divider. The charging unit is then supplied by the reference driving voltage so that the charging unit captures the electric energy for charging from the solar cell module with the maximum power. The energy storage device is charged with the electric energy for charging with maximum power. Finally, the energy stored in the energy storage device is used to supply the cholesteric liquid crystal display module for refreshing the display screen.

In a method for tracking the maximum power, the cholesteric liquid crystal display module further includes a blue, a green, and a red cholesteric liquid crystal display modules stacked from top to bottom. The solar cell module is positioned beneath the cholesteric liquid crystal display module.

The temperature value and voltage value of the comparison data are derived by measuring the current and voltage of the solar cell module at various ambient temperatures in advance.

Sensing the ambient temperature will generate an $I^2V$ signal. The charging unit has a VIN pin and a VIN_REG pin. The VIN pin is electrically coupled to the VIN_REG pin through a resistor divider. When the ambient temperature changes, the charging unit will adjust the resistor divider according to the $I^2C$ signal so that the VIN_REG pin receives a reference driving voltage with a specific adjustment threshold.

It should be noted that when viewed from the user's perspective, that is, from top to bottom, the solar cell module is stacked beneath the cholesteric liquid crystal display module.

Therefore, the present invention provides a self-powered cholesteric liquid crystal display device and a method for tracking maximum power. It utilizes the solar cell module and the display control module to track the maximum power through the power control system. The cholesteric liquid crystal display device of the present invention maximizes power generation in most environments to achieve the goal of self-sufficiency in electrical power.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features of the present invention may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

DETAILED DESCRIPTION OF THE PREFERRED EMBODIMENTS

Figure 1:
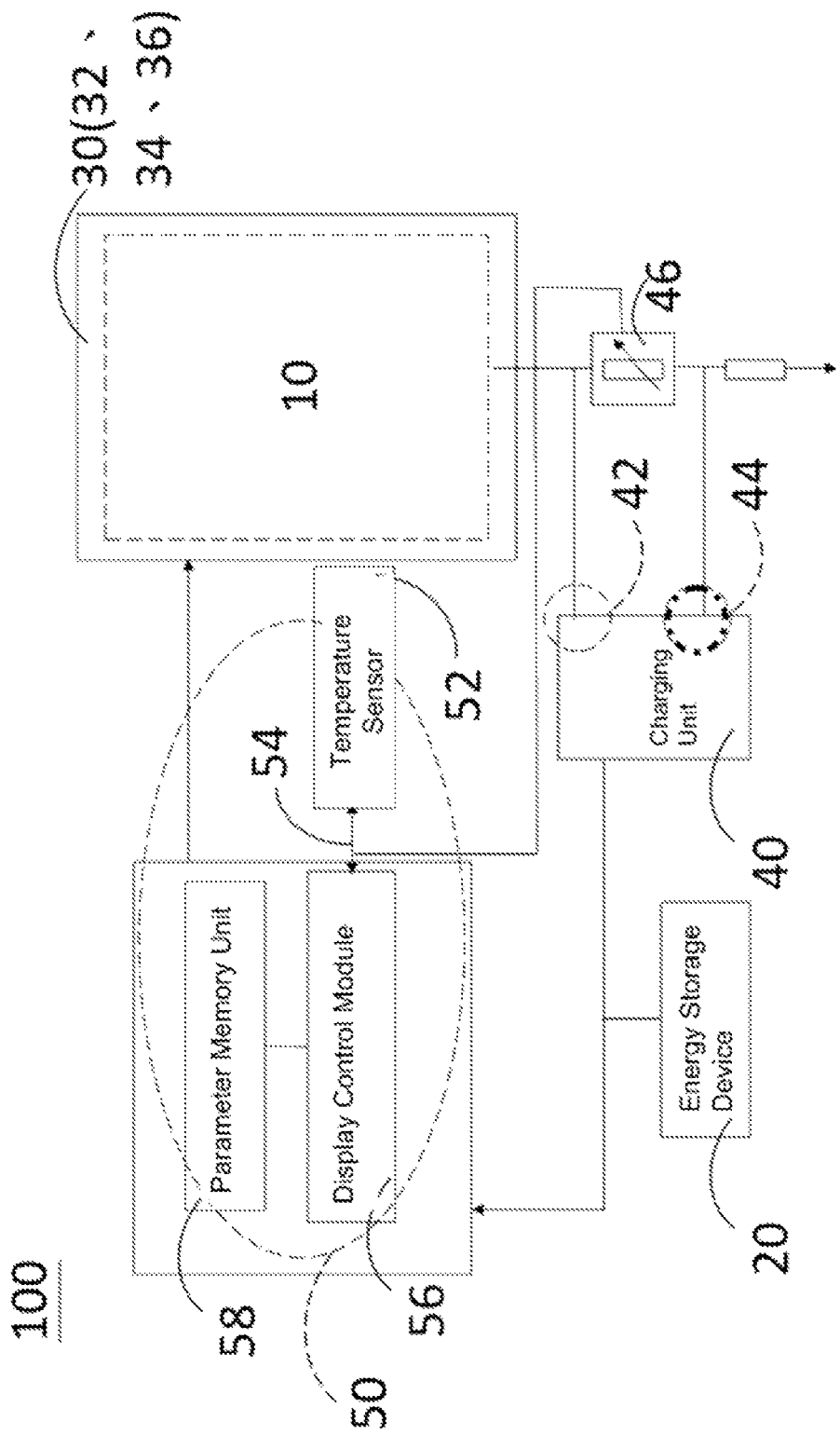
FIG. 1 is a schematic of a cholesteric liquid crystal display device of the present invention.

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

The present invention relates to a self-powered cholesteric liquid crystal display device. Please refer to FIG. 1, which is a schematic of a cholesteric liquid crystal display device 100 of the present invention. The cholesteric liquid crystal display device 100 comprises a solar cell module 10, an energy storage device 20, a cholesteric liquid crystal display module 30, a charging unit 40, a resistor divider 46, and a power control system 50. The cholesteric liquid crystal display module 30 further comprises a blue cholesteric liquid crystal display module 32, a green cholesteric liquid crystal display module 34, and a red cholesteric liquid crystal display module 36. The power control system 50 further comprises a temperature sensor 52, a parameter memory unit 58, and a display control module 56.

In the cholesteric liquid crystal display device 100, the solar cell module 10 is used to generate an electric energy for charging and can store the electric energy through the energy storage device 20. The cholesteric liquid crystal display module 30 receives the stored electric energy from the energy storage device 20 to refresh the display screen.

The charging unit 40 is electrically connected to the solar cell module 10 and receives electric energy for charging. To achieve this, a resistor divider 46 is employed to adjust the electric energy to a reference driving voltage with a specific adjustment threshold. It allows the charging unit 40 to provide the electric energy with the maximum current and store the electric energy in the energy storage device 20 through the reference driving voltage.

The temperature sensor 52 of the power control system 50 senses the ambient temperature and generates an $I^2C$ signal 54 to the display control module 56, which is electrically connected to the temperature sensor 52. The display control module 56 comprises a parameter memory unit 58, containing comparison data of temperature and voltage values. The voltage value in the parameter memory unit 58 is the voltage value of the electric energy for charging with maximum power from the solar cell module 10 when the ambient temperature matches the specified temperature value. Based on the temperature value from the temperature sensor 52 and the voltage value of the comparison data in the parameter memory unit 58, the display control module 56 adjusts and acquires the electric energy for charging from the solar cell module 10 through the digital resistor divider 46. This process is designed to derive a reference driving voltage with a specific adjustment threshold. As a result, the charging unit 40 can provide the electric energy with the maximum current, allowing the electric energy to be stored in the energy storage device 20. This approach achieves the best and fastest charging effect.

Figure 2:
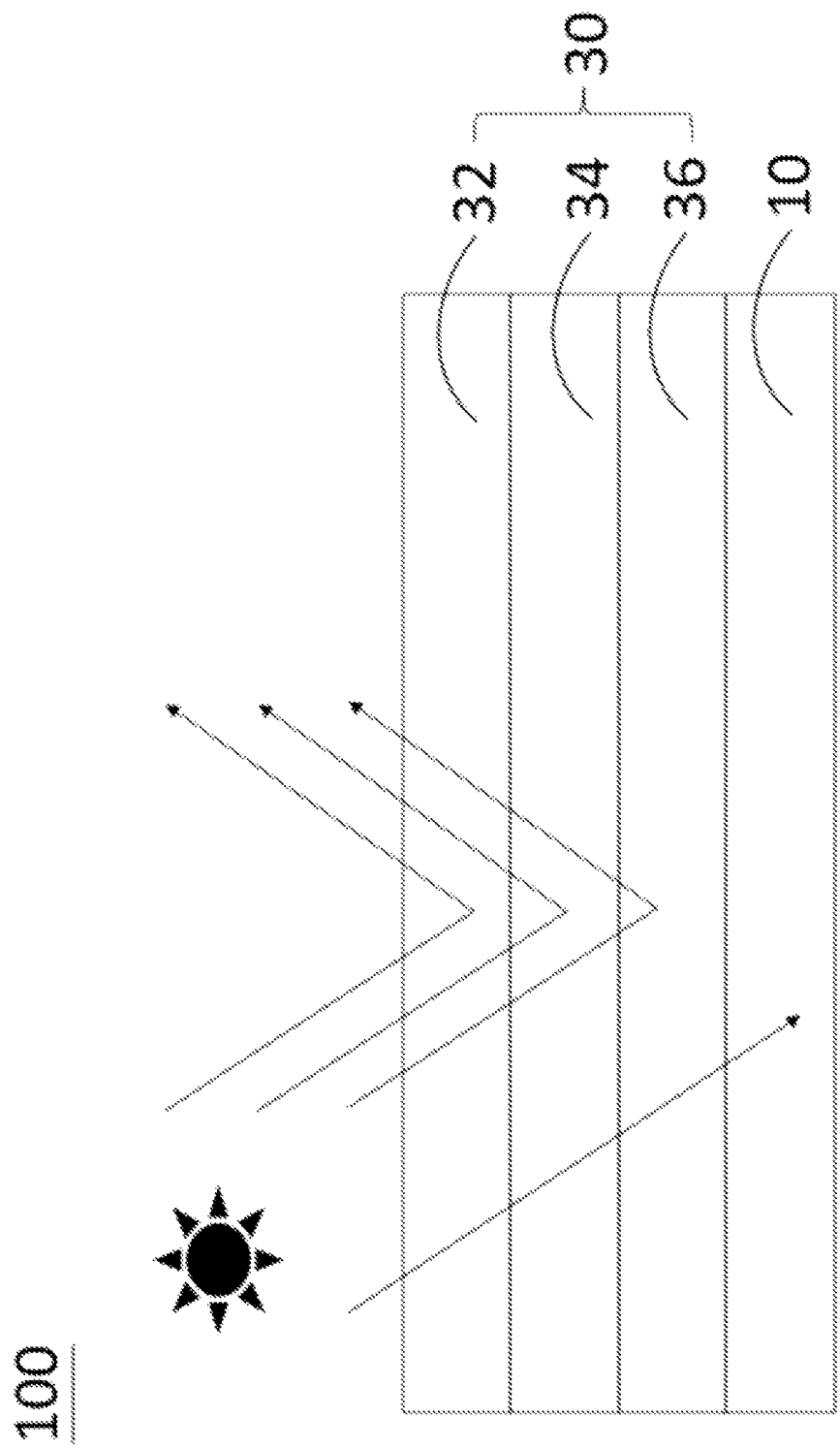
FIG. 2 is a cross-sectional view of a cholesteric liquid crystal display device of the present invention.

Please refer to FIG. 2, which illustrates a cross-sectional view of the cholesteric liquid crystal display module 30 of the present invention. The cholesteric liquid crystal display module 30 may comprise a blue cholesteric liquid crystal display module 32, a green cholesteric liquid crystal display module 34, and a red cholesteric liquid crystal display module 36, all stacked from top to bottom. In this configuration, the solar cell module 10 is disposed beneath the cholesteric liquid crystal display module 30 when viewed from the user's perspective, which is from top to bottom.

When light passes through the cholesteric liquid crystal display device 100, it reflects in the blue, green, and red cholesteric liquid crystal display modules 32, 34, and 36, respectively so that the reflected lights will be mixed to display a predetermined screen. The light that passes through the cholesteric liquid crystal display module 30 is absorbed by the solar cell module 10, where the transmitted light is converted into electric energy, so as to facilitate the aforementioned mode to excite the charging unit 40 to optimize the charging of the energy storage device 20.

Figure 3:
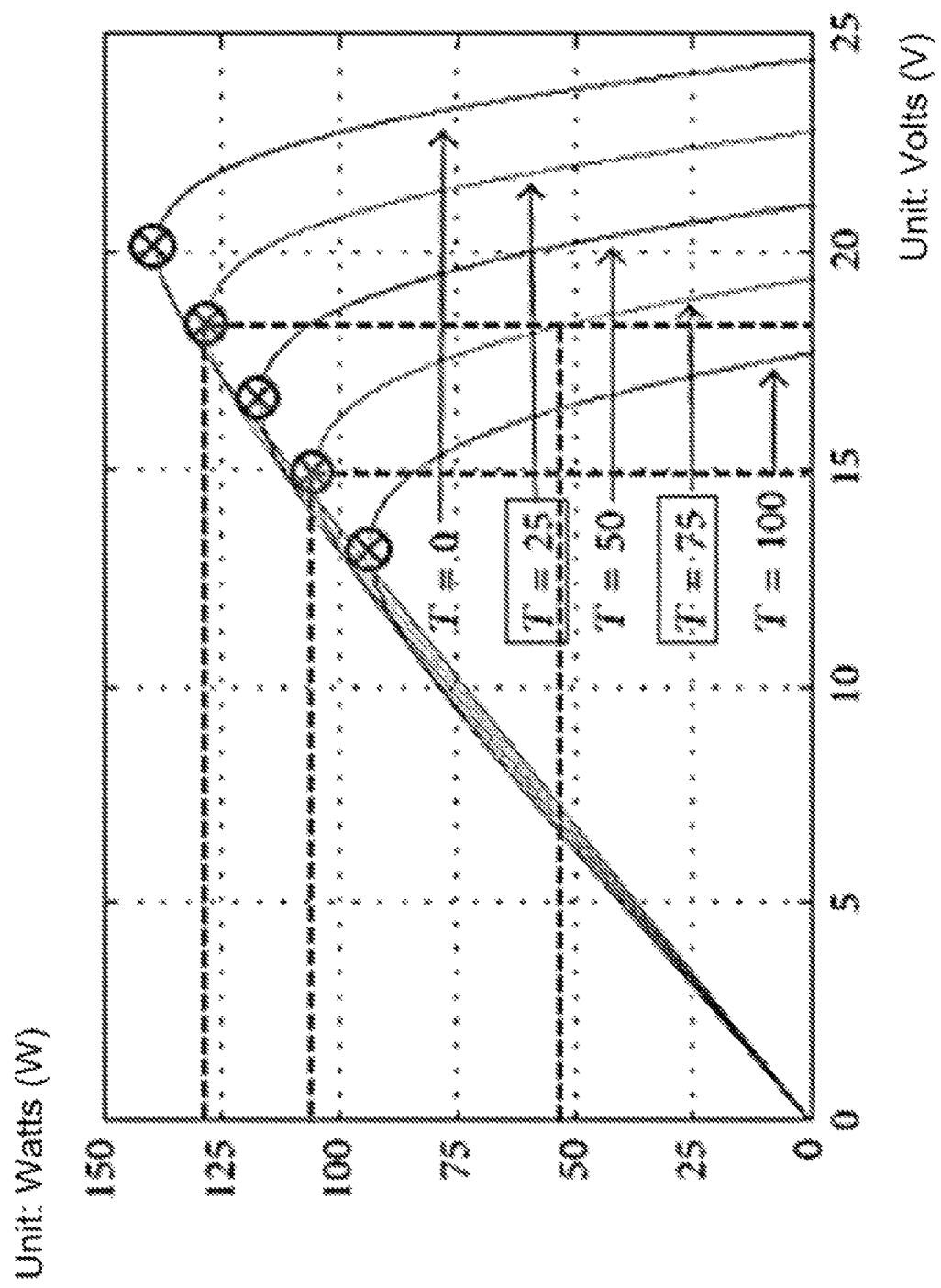
FIG. 3 is a comparison diagram between the temperature value and the voltage value of the parameter memory unit of the present invention.

Please refer to FIG. 3, which illustrates a comparison diagram between the temperature value and the voltage value of the parameter memory unit 58 of the present invention. While the solar cell module 10 absorbs light energy, it cannot determine the optimal electric energy output condition. Therefore, it relies on the comparison data of temperature and voltage values stored in the parameter memory unit 58. These comparison data are derived from the test data shown in FIG. 3. It's important to note that that comparison data is derived through the prior measurement of current and voltage of the solar cell module 10 at various ambient temperatures.

As depicted in FIG. 3, the current versus voltage characteristic curve shows different voltage values for electric energy (in volts) under varying ambient temperatures (labeled as T in degrees Celsius) to determine the maximum electric power (in watts). For instance, under an ambient temperature of 75 degrees (curve labeled T=75), when the voltage value is approximately 15 volts, the maximum electric power reaches about 105 watts. Similarly, under an ambient temperature of 25 degrees (curve labeled T=25), with a voltage value of 18 volts, the maximum electric power generated is approximately 126 watts. This illustrates that at different temperatures, the voltage value needed to reach the maximum electric power point varies. Once the parameter memory unit 58 has the comparison data, it can track the current temperature based on the ambient conditions. The resistor divider 46 can then be adjusted to provide a stable reference driving voltage to the charging unit 40 at a specific adjustment threshold. The charging unit 40 corresponds to the maximum electric power based on the comparison data, ensuring that electric energy at the maximum current is used to charge the energy storage device 20, enabling the cholesteric liquid crystal display device 100 to switch or refresh display screen.

Figure 4:
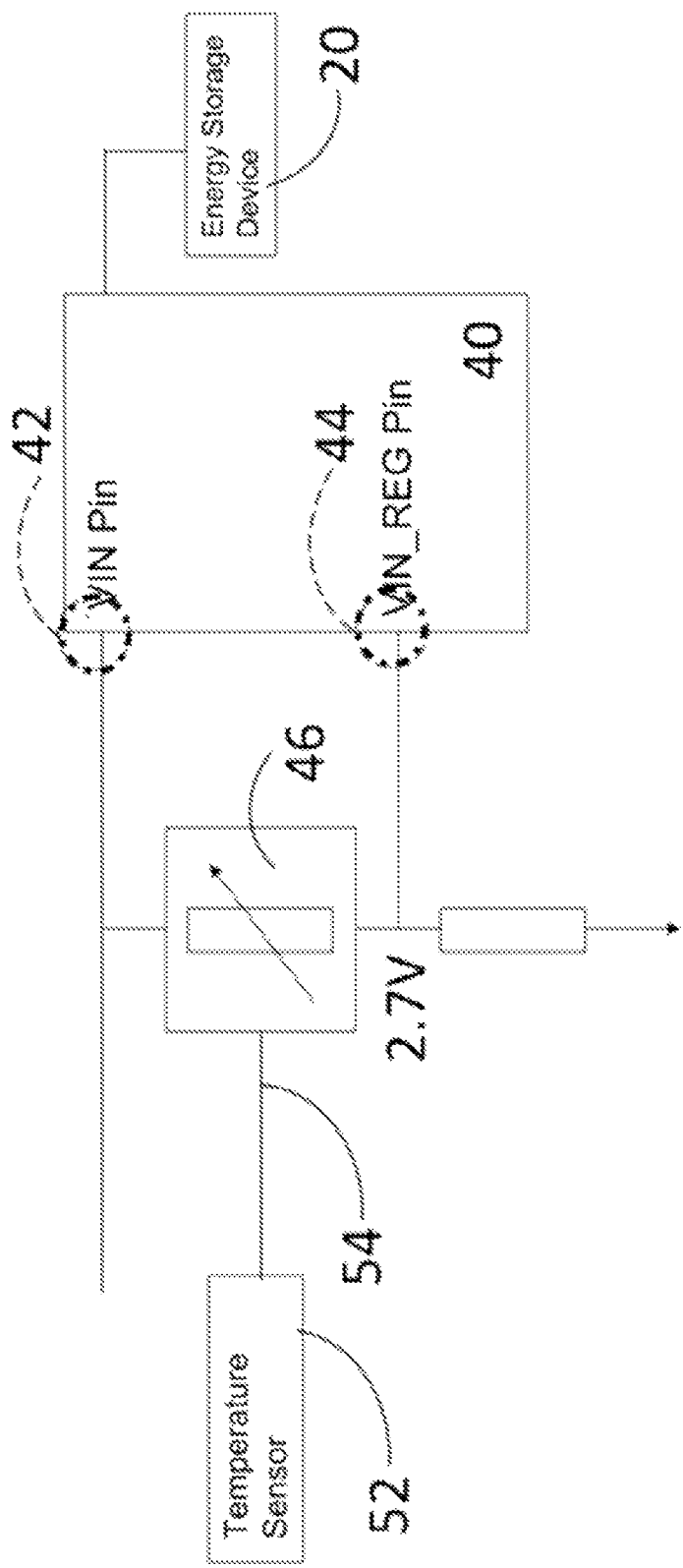
FIG. 4 is a schematic diagram of operations of the charging unit of the present invention.

Please refer to FIG. 4, which illustrates a schematic diagram of the operations of the charging unit 40 in the cholesteric liquid crystal display device 100. The charging unit 40 has a VIN pin 42 and a VIN_REG pin 44, which are electrically connected through a resistor divider 46. When the ambient temperature changes, the charging unit 40 adjusts the resistor divider 46 based on the $I^2C$ signal 54 generated after the temperature sensor 52 senses the ambient temperature. This adjustment ensures that the VIN_REG pin 44 receives a reference driving voltage with a specific adjustment threshold. As depicted in FIG. 4, the reference driving voltage with the specific adjustment threshold is set at 2.7V.

The reference driving voltage used by the charging unit 40 of the present invention is set at 2.7 volts. It's important to note that different charging unit 40 may have varying reference driving voltage configurations based on their specifications. As depicted in FIG. 4, maintaining the voltage of the VIN_REG pin 44 at 2.7 volts enables the charging unit 40 to provide maximum power to the energy storage device 20. To achieve this, the resistance value of the resistor divider 46 must be adjusted according to the $I^2C$ signal 54 and the voltage value of the parameter memory unit 58. Keeping the voltage of VIN_REG pin 44 at a specific regulation threshold, such as 2.7 volts, under different ambient temperatures will maintain continuous operation at the maximum current.

Figure 5:
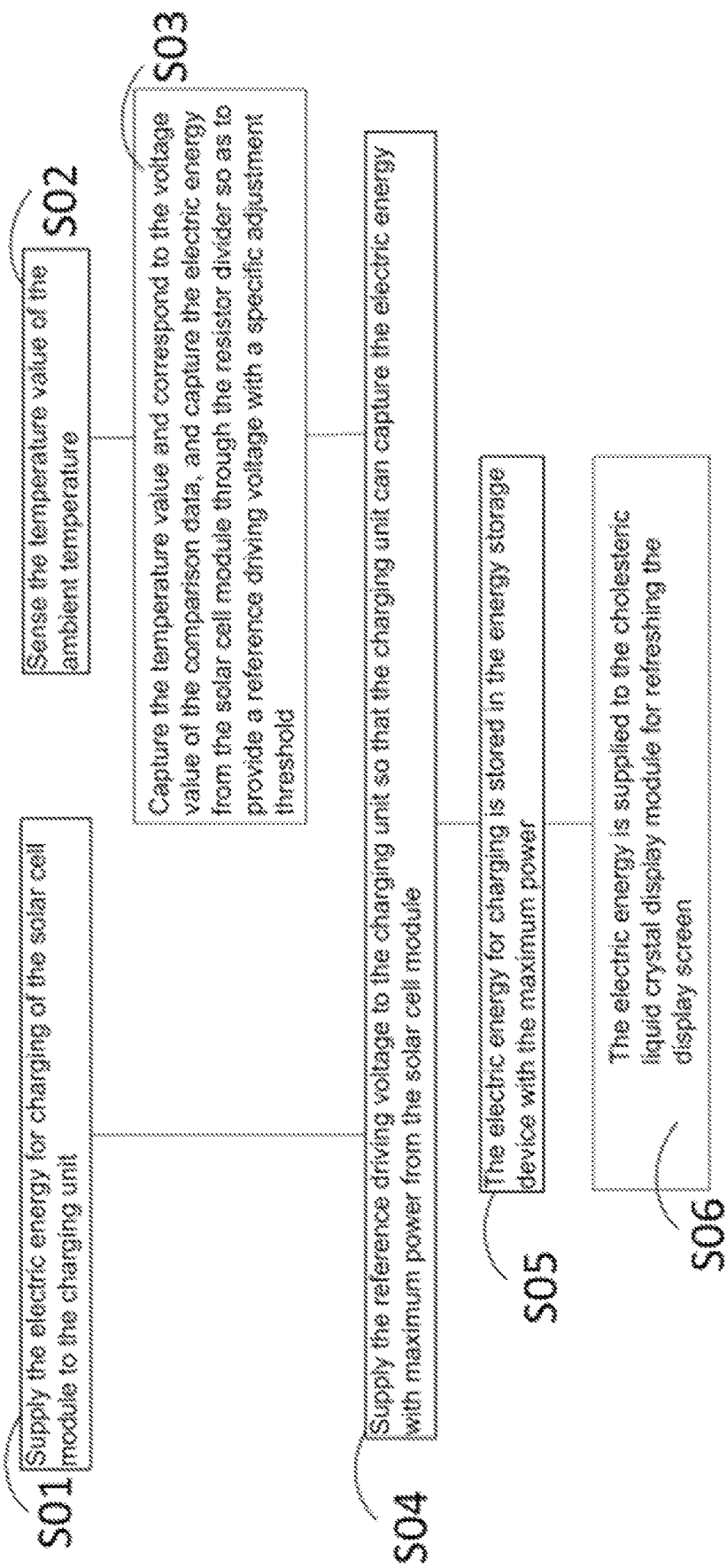
FIG. 5 is a flowchart of the maximum power tracking method of the cholesterol liquid crystal display device of the present invention.

Please refer to FIGS. 5 and 1. FIG. 5 is a flowchart illustrating a method for tracking the maximum power used in the cholesteric liquid crystal display device 100 of the present invention. The cholesteric liquid crystal display device 100 comprises a solar cell module 10, an energy storage device 20, a charging unit 40, and a cholesteric liquid crystal display module 30. The solar cell module 10 generates electric energy for charging, and the cholesteric liquid crystal display device 100 comprises comparison data for temperature and voltage values. Additionally, the cholesteric liquid crystal display module 30 consists of a blue cholesteric liquid crystal display module 32, a green cholesteric liquid crystal display module 34, and a red cholesteric liquid crystal display module 36 stacked from top to bottom.

The voltage value of the comparison data is the voltage value of the maximum power of the electric energy for charging generated by the solar cell module 10 when the ambient temperature is the temperature value. The method of tracking the maximum power comprises the following steps:

In Step S01: From the user's viewing direction, that is, from top to bottom, the solar cell module 10 positioned beneath the cholesterol liquid crystal display module 30 receives the electric energy for charging and supplies the electric energy to the charging unit 40.

In Step S02: At the same time, the temperature sensor 52 senses the temperature value of the ambient temperature, and after sensing the ambient temperature, an $I^2C$ signal 54 is generated.

In Step S03: The power control system 50 captures the $I^2C$ signal 54 to confirm the temperature value of the ambient temperature, and corresponds to the voltage value corresponding to the ambient temperature in the comparison data of the parameter memory unit 58, so that the resistor divider 46 provides a reference driving voltage with a specific adjustment threshold based on the electric energy captured from the solar cell module 10. The temperature value and voltage value of the comparison data are derived from measuring the current and voltage of the solar cell module 10 under different ambient temperatures in advance.

In Step S04: The reference driving voltage is electrically supplied to the charging unit 40. The charging unit 40 has a VIN pin 42 and a VIN_REG pin 44. The VIN pin 42 is electrically connected to the VIN_REG pin 44 through a resistor divider 46. When the ambient temperature changes, the resistor divider 46 is adjusted according to the $I^2C$ signal 54 so that the VIN_REG pin 44 receives a reference driving voltage with a specific adjustment threshold. Thus, the charging unit 40 can capture the electric energy with maximum power from the solar cell module 10.

In Step S05: Subsequently, the electric energy for charging is stored in the energy storage device 20 with the maximum power for later use.

In Step S06: The electric energy from the energy storage device 20 is used to refresh the display screen of the cholesteric liquid crystal display module 30. After the refreshing, minimal energy is needed.

Therefore, the present invention provides a self-powered cholesteric liquid crystal display device 100 and a method for tracking the maximum power. The solar cell module 10 and the display control module 56 can be matched with each other, and the maximum electric power can be tracked by the power control system 50 so that the cholesteric liquid crystal display device 100 can maximize the power generation in most environments, and the cholesteric liquid crystal display device 100 can achieve self-sufficiency in power.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A self-powered cholesteric liquid crystal display device, comprising:
    a solar cell module, used to generate an electric energy for charging;
    an energy storage device, used to store the electric energy for charging;
    a cholesteric liquid crystal display module, receiving the electric energy for charging from the energy storage device to refresh the display screen;
    a charging unit, electrically connected to the solar cell module, capturing a reference driving voltage with a specific adjustment threshold and storing the electric energy for charging to the energy storage device in the maximum power from the solar cell module, wherein the electric energy for charging is used to generate the reference drive voltage through a resistor divider;
    a power control system, comprising:
    a temperature sensor, used to sense the ambient temperature; and
    a display control module, electrically connected to the temperature sensor and comprising a parameter memory unit which comprises comparison data of a temperature value and a voltage value, and the voltage value of the parameter memory unit is the voltage value of the electric energy for charging with maximum power from the solar cell module when the ambient temperature is the temperature value, and wherein the display control module adjusts and acquires the electric energy for charging from the solar cell module through the digital resistor divider based on the temperature value from the temperature sensor so as to derive a reference driving voltage with a specific adjustment threshold;
    wherein the temperature sensor measures the ambient temperature so that an $I^2C$ signal is generated, and the charging unit comprises a VIN pin and a VIN_REG pin, and the VIN pin is electrically coupled to the VIN_REG pin through a resistor divider, and wherein when the ambient temperature changes, the charging unit adjusts the resistor divider according to the $I^2C$ signal so that the VIN_REG pin receives a reference driving voltage with a specific adjustment threshold.

2. The self-powered cholesteric liquid crystal display device according to claim 1, wherein the cholesteric liquid crystal display module comprises a blue cholesteric liquid crystal display module, a green cholesteric liquid crystal display module, and a red cholesteric liquid crystal display module stacked from top to bottom, and the solar cell module is disposed beneath the cholesteric liquid crystal display module.

3. The self-powered cholesteric liquid crystal display device according to claim 1, wherein the temperature value and the voltage value of the comparison data in the parameter memory unit is derived from measuring the current and voltage of the solar cell module at different ambient temperatures in advance.

4. The self-powered cholesteric liquid crystal display device according to claim 1, wherein the solar cell module is disposed beneath the cholesteric liquid crystal display module.

5. A method for tracking maximum power of a self-powered cholesteric liquid crystal display device comprising a solar cell module, an energy storage device, a charging unit, and a cholesteric liquid crystal display module, and wherein the solar cell module generates an electric energy for charging, and the cholesteric liquid crystal display device further comprises a comparison data for a temperature value and a voltage value, and when an ambient temperature is the temperature value, the voltage value of the comparison data is a voltage value of the electric energy for charging with maximum power from the solar cell module, the method for tracking maximum power comprises the following steps:
    supplying the electric energy for charging from the solar cell module to the charging unit;
    sensing the ambient temperature;
    capturing the sensed temperature value and corresponding to a voltage value of the comparison data so as to capture the electric energy for charging from the solar cell module and derive a reference driving voltage with a specific adjustment threshold through a voltage divider;
    supplying the reference driving voltage to the charging unit so that the charging unit captures the electric energy for charging in the maximum power from the solar cell module;
    charging the energy storage device by the electric energy for charging with maximum power; and
    supplying the electric energy for charging from the energy storage device to the cholesteric liquid crystal display module for refreshing the display screen;
    wherein the temperature sensor measures the ambient temperature so that an $I^2C$ signal is generated, and the charging unit comprises a VIN pin and a VIN_REG pin, and the VIN pin is electrically coupled to the VIN_REG pin through a resistor divider, and wherein when the ambient temperature changes, the charging unit adjusts the resistor divider according to the $I^2C$ signal so that the VIN_REG pin receives a reference driving voltage with a specific adjustment threshold.

6. The method for tracking maximum power of a self-powered cholesteric liquid crystal display device according to claim 5, wherein the cholesteric liquid crystal display module comprises a blue cholesteric liquid crystal display module, a green cholesteric liquid crystal display module, and a red cholesteric liquid crystal display module, all stacked from top to bottom, and the solar cell module is disposed beneath the cholesteric liquid crystal display module.

7. The method for tracking maximum power of a self-powered cholesteric liquid crystal display device according to claim 5, wherein the temperature value and the voltage value of the comparison data are derived from measuring the current and voltage of the solar cell module at different ambient temperatures in advance.

8. The method for tracking maximum power of a self-powered cholesteric liquid crystal display device according to claim 5, wherein the solar cell module is disposed beneath the cholesteric liquid crystal display module.

* * * * *